United States Patent
Zhu et al.

(10) Patent No.: US 9,727,402 B1
(45) Date of Patent: Aug. 8, 2017

(54) TRANSCEIVER PARAMETER SOLUTION SPACE VISUALIZATION TO REDUCE BIT ERROR RATE

(71) Applicant: Altera Corporation, San Jose, CA (US)

(72) Inventors: Shuangxia Zhu, San Jose, CA (US); Yongliang Lu, San Jose, CA (US); Zhi Y. Wong, San Jose, CA (US)

(73) Assignee: Altera Corporation, San Jose, CA (US)

( * ) Notice: Subject to any disclaimer, the term of this patent is extended or adjusted under 35 U.S.C. 154(b) by 12 days.

(21) Appl. No.: 14/616,139

(22) Filed: Feb. 6, 2015

(51) Int. Cl.
  *G06F 11/00* (2006.01)
  *G06F 11/07* (2006.01)
  *H04B 1/401* (2015.01)

(52) U.S. Cl.
  CPC ......... *G06F 11/0769* (2013.01); *H04B 1/401* (2013.01)

(58) Field of Classification Search
  CPC .................................................. G06F 11/0769
  See application file for complete search history.

(56) References Cited

U.S. PATENT DOCUMENTS

| | | | | |
|---|---|---|---|---|
| 2002/0196229 | A1* | 12/2002 | Chen | G06T 11/60 345/157 |
| 2013/0069949 | A1* | 3/2013 | Dembo | G06T 11/206 345/440 |
| 2016/0028487 | A1* | 1/2016 | Kan | H04B 10/40 398/136 |

OTHER PUBLICATIONS

"High-Speed Link Tuning Using Signal Conditioning Circuitry in Stratix V Transceivers", Altera Corporation pp. 1-13.

\* cited by examiner

*Primary Examiner* — Jason Bryan
(74) *Attorney, Agent, or Firm* — Fletcher Yoder P.C.

(57) ABSTRACT

Techniques and mechanisms provide a solution space visualization of bit error rates (BER) for combinations of parameter settings of transceivers. Different types of visualizations may be generated.

21 Claims, 6 Drawing Sheets

Method for Generating a Visualization of BER 500

Receive parameter data 510

Receive selected parameters 520

Generate visualization 530

TRANSCEIVER PARAMETER SOLUTION SPACE VISUALIZATION TO REDUCE BIT ERROR RATE

TECHNICAL FIELD

This disclosure generally relates to integrated circuits. More specifically, the disclosure relates to a solution space visualization of parameters for a circuit such as a transceiver.

DESCRIPTION OF THE RELATED TECHNOLOGY

Transceivers provide communications between different devices. For example, parallel data may be received by a transceiver on a device and converted into serial data (e.g., with a transmitter of the transceiver) for high-speed transmission over a cable or a printed circuit board (PCB) trace to another device with another transceiver that receives the serialized data and converts it back into parallel data (e.g., with a receiver of the other transceiver). Multiple transceivers on a device may also provide data to multiple transceivers on another device to create transceiver-transceiver pairs for transmitting and receiving data in a high-speed serial interface.

A variety of parameters for the transceivers can be configured for particular uses. Different combinations of parameters may lead to different bit error rates (BER) associated with the transmission of data between the transceivers. Accordingly, a designer may wish to be able to select a combination of parameters that allows for a lower BER.

SUMMARY

The subject matter described herein provides a generation of a solution space visualization of bit error rates (BER) that allows for an easier selection of parameters of a circuit, such as a transceiver.

Transceivers may include a variety of functionality that may be adjusted. For example, certain parameters may be adjusted to particular values based on how the transceivers are to be used. The setting of the parameter values may affect the BER of the transceivers. In one implementation, generating a visualization of the BER showing how the values of the parameters affect the BER may allow for a designer to select a combination of parameter values better suited for how the transceivers are to be used.

These and other features will be presented in more detail in the following specification and the accompanying figures, which illustrate by way of example.

DETAILED DESCRIPTION OF PARTICULAR EMBODIMENTS

The following examples illustrate embodiments using transceivers. However, the techniques and methodologies disclosed herein may also be used in other types of circuits other than transceivers.

Figure 1:
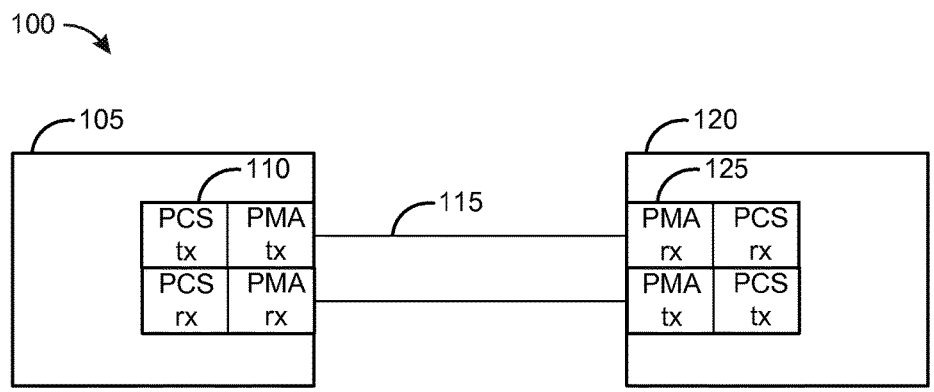
FIG. 1 illustrates an example of a transceiver-transceiver pair in accordance with some implementations.

FIG. 1 illustrates an example of a transceiver-transceiver pair in accordance with some implementations. Generally, transceivers may include a transmitter for transmitting data and a receiver for receiving data. In the implementation of FIG. 1, system 100 includes logic device 105 including transceiver 110 and logic device 120 including transceiver 125 communicating to each other through cable 115. Logic devices 105 and 120 may be microprocessors, application specific integrated circuits (ASICs), and programmable logic devices (PLDs) such as field programmable gate arrays (FPGAs), complex programmable logic devices (CPLDs), structured ASICs, etc. Cable 115 may be a physical medium or interconnect.

In FIG. 1, transceiver 110 may include a transmitter (indicated as tx; receivers are indicated as rx) for providing data on cable 115 and to a receiver of transceiver 125. Each transceiver 110 and 125 may include a Physical Coding Sublayer (PCS) sublayer and a Physical Medium Attachment (PMA) sublayer. The PCS of a transceiver may include digital logic for processing data (e.g., serializing data that is in a parallel format) to be provided to the PMA. The PMA may include analog circuitry for receiving and transmitting the serial data provided by the PCS.

Often, parameters of the PMA may be configured, or set, to a variety of settings or values based on how transceivers 110 and 125 are being used. For example, if system 100 is being used in an Ethernet application, the direct current (DC) gain of one or both of transceivers 110 and 125 may be adjusted to provide proper functionality for an Ethernet application. A variety of other parameters (e.g., VOD Control, pre-emphasis taps (i.e., pre-tap, $1^{st}$ post-tap, $2^{nd}$ post-tap), equalization control, etc.) of receivers or transmitters of transceivers 110 and 125 may also be set to particular values based on the application.

The values of the parameters may affect the bit error rate (BER) of the data transmitted on cable 115. Bit errors may be received bits of a data stream over cable 115 that are incorrect, for example, due to noise, interference, distortion, bit synchronization, or other issues. For example, if a transmitter of transceiver 110 is to provide data to a receiver of transceiver 125 over cable 115, certain bits may be incorrectly transmitted (e.g., a "1" is received by transceiver 125 as a "0"). Generally, a designer may wish to have the BER as low as possible, or within certain tolerances based on the application. Different applications may have different BER tolerances. Accordingly, some parameter values may be selected such that a higher performance is achieved despite a high BER being observed, but the application may perform properly if the BER is within an expected range. In another application, the parameter values of transceivers 110 and 125 may be different to achieve a different level of performance and/or BER.

Generally, a designer of system 100 may need to select values for dozens of parameters of both transceivers 110 and 125. For example, the designer may set parameter values for a transmitter of transceiver 110 and a receiver of transmitter 125. The designer may then have system 100 analyzed to determine the BER of system 100 based on the selected values for the parameters. If the BER is outside the tolerance of the application (e.g., the BER is too high), then the designer may change the values of some of the parameters to try to get the BER within the tolerance for the application. Such a process may be lengthy, taking several attempts for the designer to find a combination of parameters meeting the needs of system 100.

Figure 2:
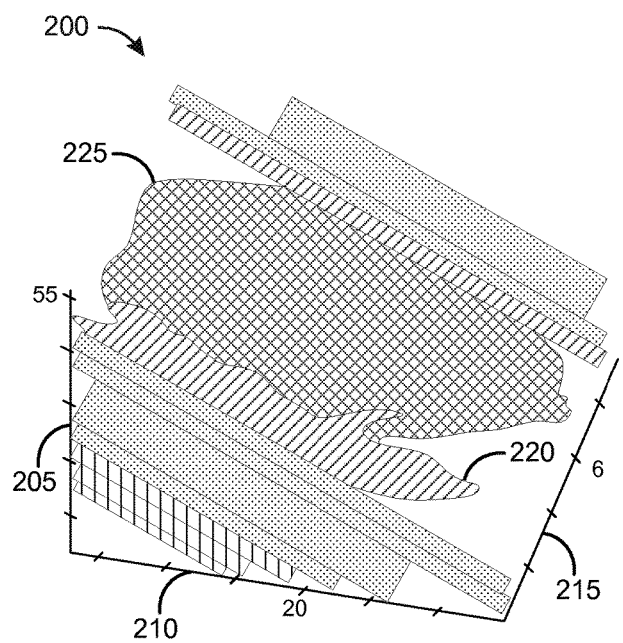
FIG. 2 illustrates an example of a 3D solution space visualization of transceiver parameters.

Providing a solution space visualization of the parameters of transceivers 110 and 125 and their effects on BER may allow for an easier and faster selection of parameter values for system 100. FIG. 2 illustrates an example of a 3D visualization of transceiver parameters. The solution space visualization in FIG. 2 provides the set of all possible combinations of the displayed parameters.

In FIG. 2, graph 200 may be a three-dimensional (3D) chart or graph providing a visualization of the BER associated with parameters of transceivers 110 and 125. For example, y-axis 205 may be associated with one parameter of transceiver 110, for example, values for VOD control. X-axis 210 may be associated with pre-emphasis $1^{st}$ post-tap, and therefore, indicates values for pre-emphasis $1^{st}$ post-tap. Z-axis 215 may indicate values for equalization control. Accordingly, each coordinate may be associated with a combination of the three parameters corresponding to the three axes.

The parameters to be used in graph 200 may be selected from a list of available parameters and associated with a particular axis. For example, the designer may use a software program with a graphical user interface (GUI) with checkboxes, drop-down boxes, or any other selection mechanism to specify the parameters and which axis they may be graphed upon. Different combinations of the selected three parameters may provide a different BER. For example, region 220 of graph 200 may be associated with a high BER. Accordingly, coordinates of y-axis 205, x-axis 210, and z-axis 215 within region 220 may indicate that the combination of parameters associated with the coordinates may have a high BER, and therefore, should not be selected by the designer for system 100. However, region 225 in graph 200 may be a region of coordinates with a low BER. For example, y-axis 205 having a value of 55 (i.e., VOD control is set to 55), x-axis 210 having a value of 20 (i.e., pre-emphasis $1^{st}$ is set to 20), and z-axis 215 having a value of 6 (i.e., equalization control is set to 6) may provide a combination of parameters with a low BER since the coordinate associated with the combination is within region 225. As such, each region in graph 200 may be a shape (e.g., a 3D shape or surface) with the same BER for coordinates within the shape.

In some implementations, the selected three parameters may be associated with transceiver 110 (e.g., its transmitter) or transceiver 125 (e.g., its receiver). In some implementations, the selected three parameters may include one or more parameters associated with the transmitter of transceiver 110 and one or more parameters associated with the receiver of transceiver 125.

Accordingly, the designer may select a variety of coordinates from within region 225 to have system 100 operate with a low BER. By selecting a particular coordinate, the designer may also be provided the appropriate values to set the corresponding parameters (e.g., VOD control, pre-emphasis $1^{st}$ post-tap, and equalization control in the example). Additionally, the designer is provided an easier time to select the appropriate values for the parameters because the visualization provides an easy-to-use graphical method to select the parameters for transceivers 110 and 125. Moreover, the designer may be able to select a combination of parameters within the middle of region 225. Selecting a coordinate associated with a combination of parameters within the middle of region 225 may allow for the designer to have a higher tolerance for system 100. For example, temperature or voltage variations within system 100 may affect the values for the parameters, and therefore, selecting a point in the middle of region 225 allows for more leeway when parameters are affected by the variations. The designer may then select additional parameters to visualize (i.e., generate a new graph with new parameters corresponding to the axes) and choose coordinates for further values of other parameters or see how the other parameters affect the BER.

In some implementations, graph 200 may be rotatable such that the designer may be able to see how the parameter values affect BER from different perspectives.

In some implementations, the different regions associated with different BERs may have different colors. For example, a color spectrum having a gradient of colors (e.g., from violet, blue, green, yellow, orange, to red) with one color (e.g., violet) being associated with a low BER and another color (e.g., red) being associated with a high BER with all colors in between having a BER between the low and high BERs. The designer may be provided the color spectrum and the BER for particular colors or points within the color spectrum to aid in interpreting graph 220.

In some implementations, the visualization of the parameters of transceivers 110 and 125 may further be based on a criteria selection. For example, if the designer specifies that only regions having a BER lower than 1e10 are to be visualized, then only those regions fitting that criteria may be generated. The regions above the threshold value of 1e-10 (i.e., 1 bit out of a total of 1e10 bits) may be left out, and therefore, the designer may easily determine a combination of parameters providing an acceptable BER. The designer may be able to specify the criteria by manipulating the GUI (e.g., selecting a value from a drop-down box).

Figure 3A:
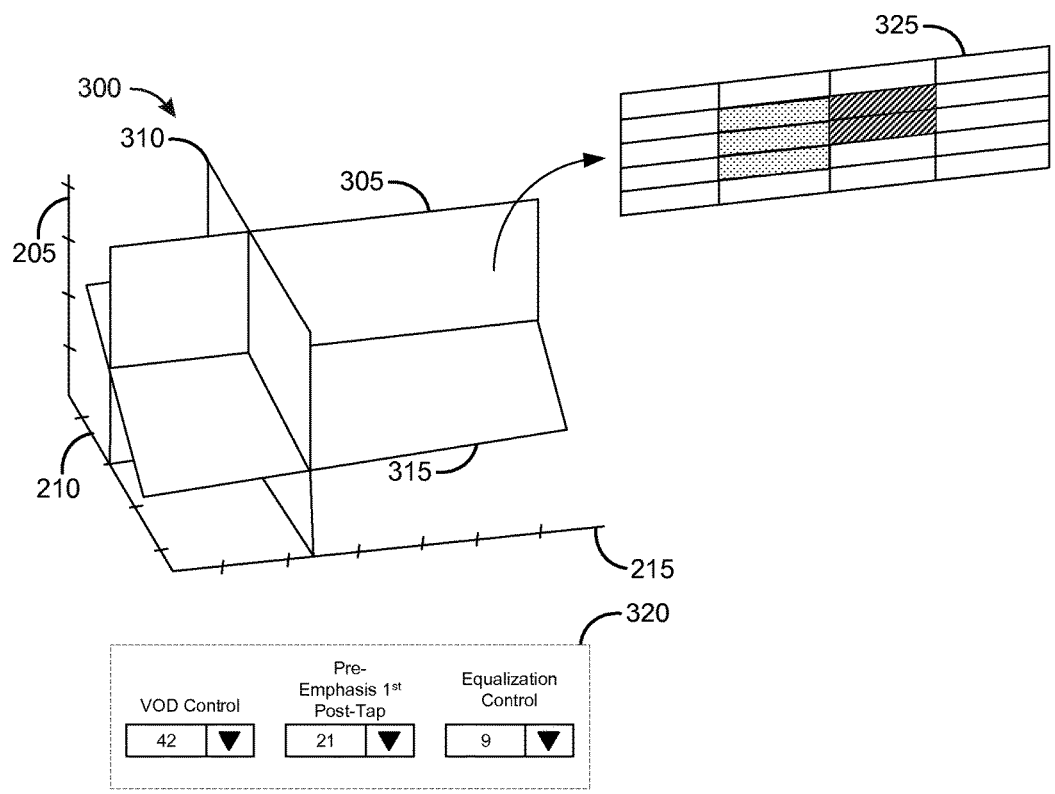
FIGS. 3A and 3B illustrate examples of 3D solution space visualizations with slices of transceiver parameters.
Figure 3B:
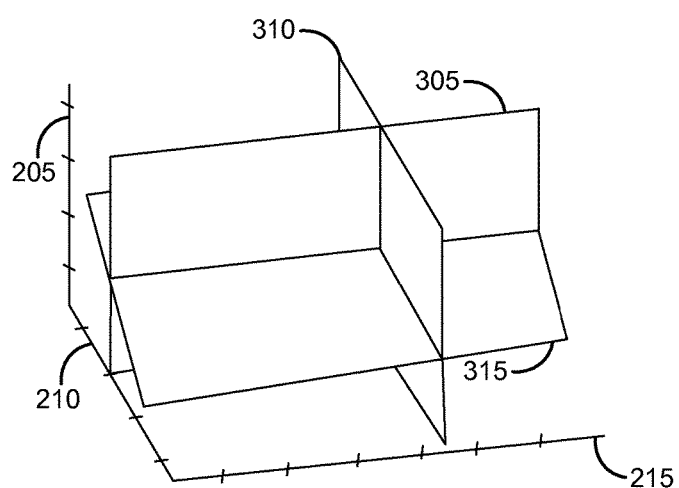

Different visualizations of transceiver parameters used to determine the BER may be generated for and used by the designer. FIGS. 3A and 3B illustrate examples of 3D visualizations with slices of transceiver parameters.

In FIG. 3A, graph 300 provides a visualization of transceiver parameters based on slices of planes associated with values of the transceiver parameters. In graph 300, y-axis 205 may indicate values for VOD control, x-axis 210 may indicate values for pre-emphasis $1^{st}$ post-tap, and z-axis 215 may indicate values for equalization control, as in FIG. 2. In criteria selections 320, slices from the 3D shape may be selected to be generated in graph 300. For example, criteria selections 320 may receive input from a designer indicating that the designer wants to see slices of BER data for VOD control, pre-emphasis $1^{st}$ post-tap, and equalization control set at values of 42, 21, and 9, respectively. Accordingly, three slices may be generated to provide a visualization of transceiver parameters: slice 315 showing the BER for a VOD control set to 42, slice 305 showing the BER for a pre-emphasis $1^{st}$ post-tap set to 21, and slice 310 for equalization control set at 9.

For example, in slice 305, a variety of regions and their BER may be displayed, for example, as portrayed in detailed slice representation 325 (i.e., a more detailed representation of the portion of slice 305 that is above slice 315). In detailed slice representation 325, the different shaded and non-shaded portions may represent regions where the combination of transceiver parameters associated with them have different BER, similar to FIG. 2. The visualization is based on pre-emphasis $1^{st}$ post-tap set to 21. That is, if pre-emphasis $1^{st}$ post-tap is 21, then the two axis of slice 305 (or detailed slice representation 325) provide variables for the other two parameters: VOD control and equalization control. Accordingly, the designer may be able to visualize the BER for each combination of VOD control and equalization control parameters with a fixed value for pre-emphasis $1^{st}$ post-tap. Likewise, slices 310 and 315 also provide similar visualizations with one of the other parameters being fixed.

If any of the criteria selections 320 are changed, then graph 300 may be updated accordingly, For example, in FIG. 3B, if equalization control in criteria selections 320 is changed to 4 from 9 (as in FIG. 3A), then slice 310 may be moved and generated based on equalization control being set to 4. Accordingly, new BER may be visualized in slice 310 based on the new value for the parameter.

Figure 4:
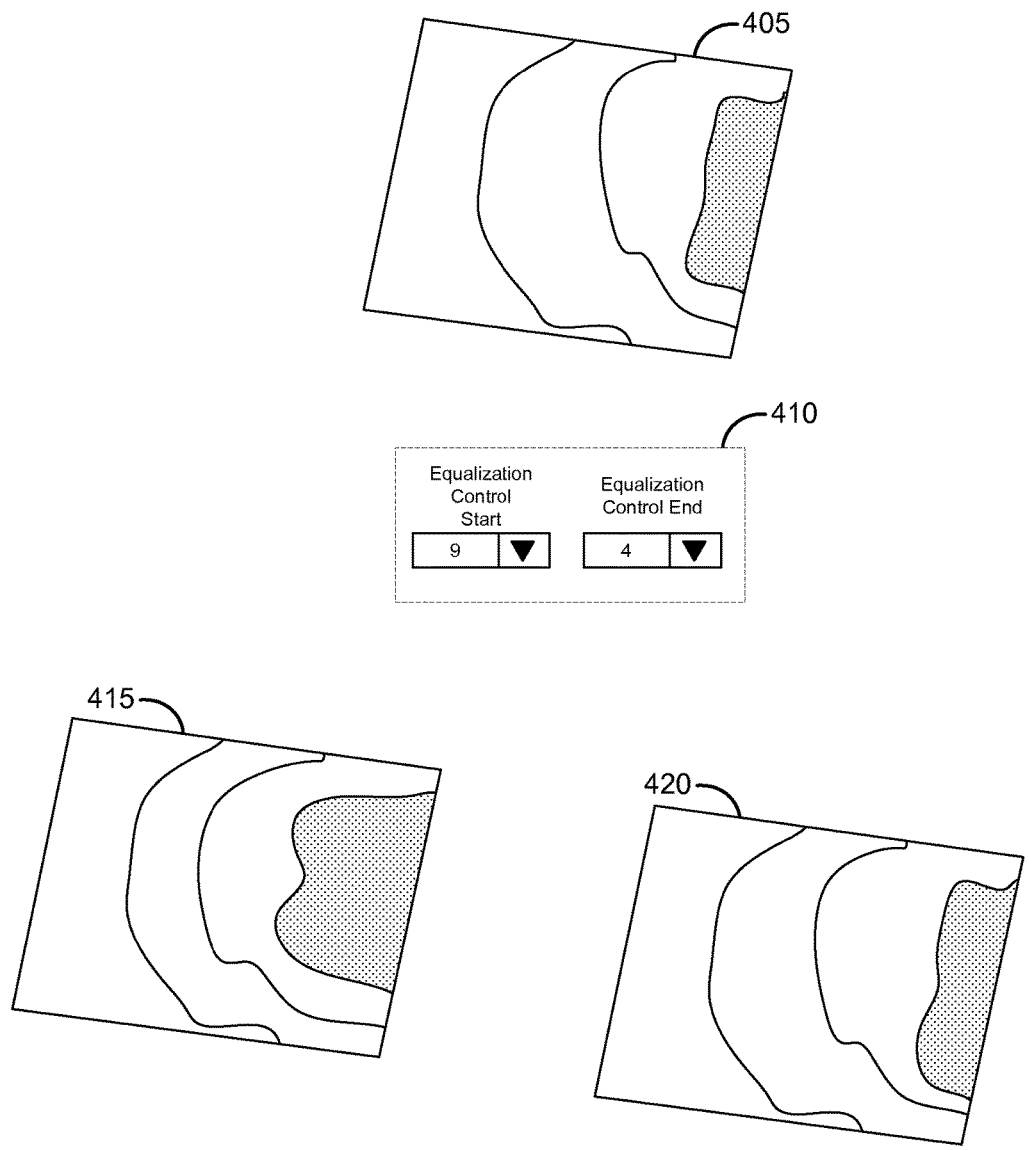
FIG. 4 illustrates an example of an overlaid slices visualization of transceiver parameters.
Figure 5:
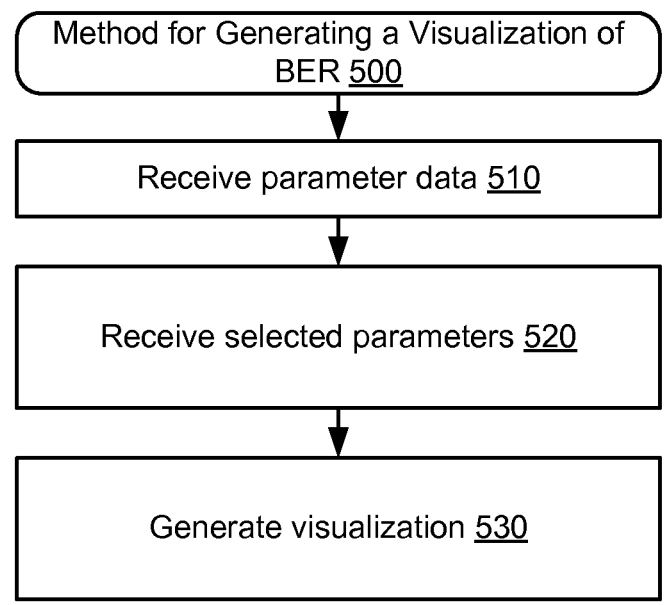
FIG. 5 is a flowchart illustrating a process flow for visualizing parameters of transceivers in accordance with some implementations.

FIG. 4 illustrates an example of an overlaid slices visualization of transceiver parameters. In FIG. 4, graph 405 may be a 2D graph merging multiple slices. For example, if VOD control, Pre-Emphasis $1^{st}$ post-tap, and equalization control are to be considered when evaluating BER, as in FIG. 3A, a 2D graph 405 may be generated by merging a series of slices associated with one of the parameters along values of its axis. For example, graph 405 may be based on graphs 415 and 420, with graph 415 being slice 310 from FIG. 3A and graph 420 being slice 310 from FIG. 3B. That is, graph 405 may combine data from both graphs 415 and 420 to provide BER data for a particular range of values for a parameter.

In FIG. 4, the particular overlaid slices may be specified by criteria selection 410. For example, in FIG. 4, a designer may be allowed to specify the range of equalization control to be merged. In FIG. 4, a range of equalization control values from 9 to 4 may be merged to generate graph 405. That is, slices associated with equalization control values 4, 5, 6, 7, 8, and 9 may be determined and merged to generate graph 405. In graph 405, the shaded region may be the region with the lowest BER, which is the lowest BER region common to all of the slices associated with the equalization control values 4-9.

In some implementations, the graphs from FIGS. 2-4 may be generated based on imported data. For example, the designer may be able to import a database, spreadsheet, or other type of data indicating the BER for combinations of parameters. Accordingly, when the data is imported, for example with a software program including a GUI, the user may then be provided options for parameters to select to be graphed, associate parameters with axes, and choose a type of graph to be generated to visualize the BER based on the parameters.

5 is a flowchart illustrating a process flow for visualizing parameters of transceivers in accordance with some implementations. In method 500, at block 510, parameter data may be received. For example, as previously discussed, data indicating the BER for each combination of parameters may be received. At block 520, parameters may be selected. For example, as previously discussed, a designer may select some parameters (e.g., three for a three-dimensional graph) to be graphed as well as which parameters correspond with which axis. At block 530, the graph may be generated. For example, the axes of the graph may each be associated with a corresponding parameter and the BER data may be displayed in the graph, as previously discussed.

Figure 6:
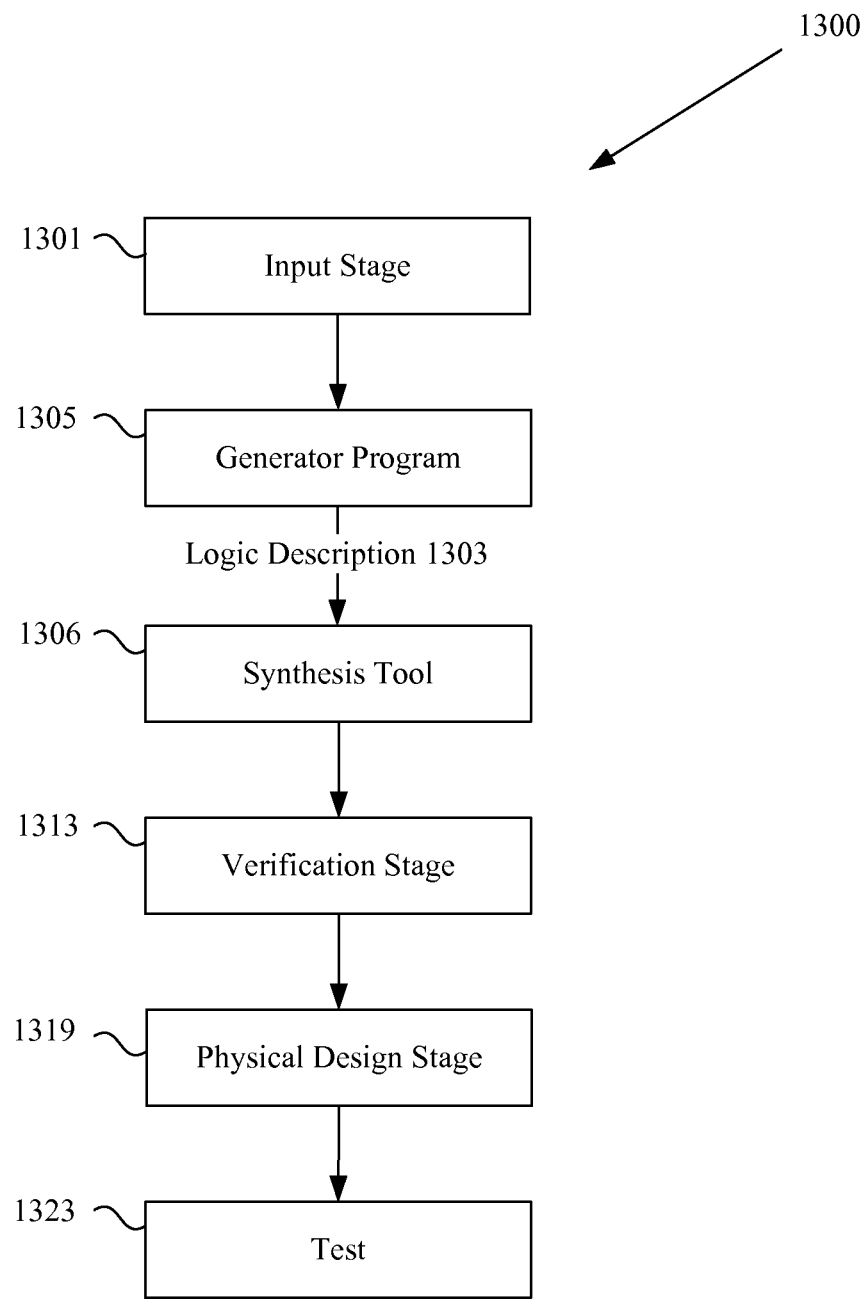
FIG. 6 illustrates a technique for implementing a programmable chip.

In some implementations, the transceivers may be implemented in a programmable chip. For example one or both of logic devices 105 and 120 may be an FPGA. FIG. 6 illustrates a technique for implementing a programmable chip. An input stage 1301 receives selection information typically from a user for logic such as a processor core as well as other components to be implemented on an electronic device. In one example, the input received is in the form of a high-level language program. A generator program 1305 creates a logic description and provides the logic description along with other customized logic to any of a variety of synthesis tools, place and route programs, and logic configuration tools to allow a logic description to be implemented on an electronic device.

In one example, an input stage 1301 often allows selection and parameterization of components to be used on an electronic device. The input stage 1301 also allows configuration of hard coded logic. In some examples, components provided to an input stage include intellectual property functions, megafunctions, and intellectual property cores. The input stage 1301 may be a graphical user interface using wizards for allowing efficient or convenient entry of information. The input stage may also be a text interface or a program reading a data file such as a spreadsheet, database table, or schematic to acquire selection information. The input stage 1301 produces an output containing information about the various modules selected. At this stage, the user may enter security information about individual components that needs to be isolated. For example, different levels of component security and which components are allowed to communicate with each other may be entered.

In typical implementations, the generator program 1305 can identify the selections and generate a logic description with information for implementing the various modules. The generator program 1305 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 1305 identifies pointers and provides ports for each pointer. One tool with generator program capabilities is System on a Programmable Chip (SOPC) Builder available from Altera Corporation of San Jose, Calif. The generator program 1305 also provides information to a synthesis tool 1307 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 1301, generator program 1305, and synthesis tool 1307 can be separate programs. The interface between the separate programs can be a database file, a log, or simply messages transmitted between the programs. For example, instead of writing a file to storage, the input stage 1301 can send messages directly to the generator program 1305 to allow the generator program to create a logic description. Similarly, the generator program can provide information directly to the synthesis tool instead of writing HDL files. Similarly, input stage 1301, generator program 1305, and synthesis tool 1307 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 1307.

A synthesis tool 1307 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 1313 typically follows the synthesis stage 1307. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 1313, the synthesized netlist file can be provided to physical design tools 1319 including place and route and configuration tools. A place and route tool locates logic cells on specific logic elements of a target hardware device and connects wires between the inputs and outputs of the various logic elements in accordance with logic and security provided to implement an electronic design. According to various embodiments of the present invention, the place and route tool may perform the techniques of the present invention to implement the various security requirements and rules as defined by the user. The iterative technique may be transparent to the user, but the resulting device can be physically tested at 1323.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be used using various techniques of the present invention.

As noted above, different stages and programs can be integrated in a variety of manners. According to one embodiment, the input stage 1301, the generator program 1305, the synthesis tool 1307, the verification tools 1313, and physical design tools 1319 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 7:
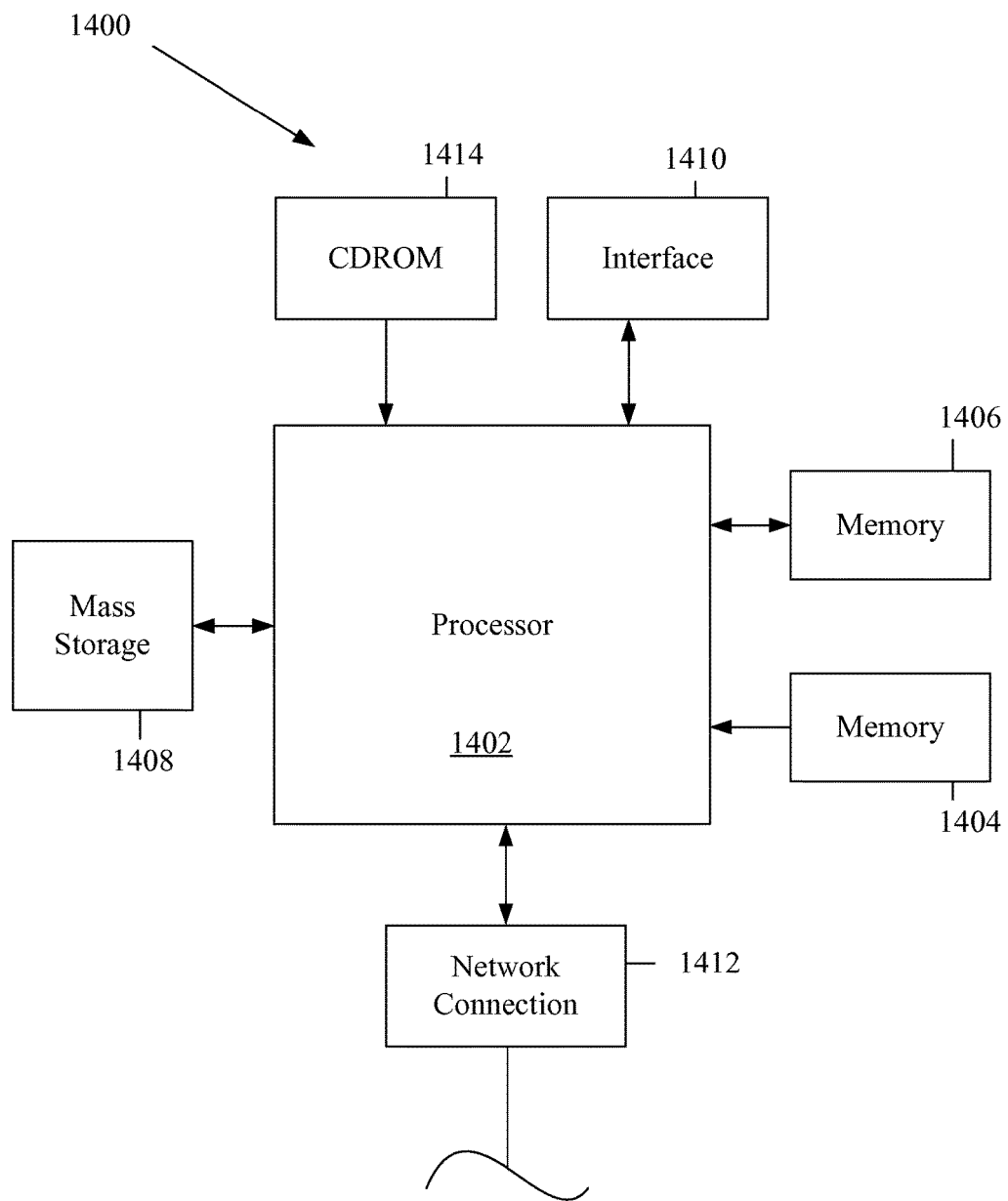
FIG. 7 illustrates one example of a computer system.

FIG. 7 illustrates one example of a computer system implementing the techniques disclosed herein. The computer system 900 includes any number of processors 1402 (also referred to as central processing units, or CPUs) that are coupled to devices including memory 1406 (typically a random access memory, or "RAM"), memory 1404 (typically a read only memory, or "ROM"). The processors 1402 can be configured to generate an electronic design. As is well known in the art, memory 1404 acts to transfer data and instructions uni-directionally to the CPU and memory 1406 are used typically to transfer data and instructions in a bi-directional manner.

Both of these memory devices may include any suitable type of the computer-readable media described above. A mass storage device 1408 is also coupled bi-directionally to CPU 1402 and provides additional data storage capacity and may include any of the computer-readable media described above. The mass storage device 1408 may be used to store programs, data and the like and is typically a secondary storage medium such as a hard disk that is slower than memory. The mass storage device 1408 can be used to hold a library or database of prepackaged logic or intellectual property functions, as well as information on generating particular configurations. It will be appreciated that the information retained within the mass storage device 1408, may, in appropriate cases, be incorporated in standard fashion as part of memory 1406 as virtual memory. A specific mass storage device such as a CD-ROM 1414 may also pass data uni-directionally to the CPU.

CPU 1402 is also coupled to an interface 1410 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 1402 may be a design tool processor. Finally, CPU 1402 optionally may be coupled to a computer or telecommunications network using a network connection as shown generally at 1412. With such a network connection, it is contemplated that the CPU might receive information from the network, or might output information to the network in the course of performing the above-described process steps. It should be noted that the system 1400 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes can also be used to practice the techniques of the present invention.

While particular embodiments of the invention have been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for generating a visualization of bit error rates for parameters of one or more transceivers, the method comprising:
   receiving parameter combination data comprising parameters of one or more transceivers, wherein the parameter combination data indicates bit error rates (BER) for combinations of values of the parameters of the one or more transceivers;
   receiving selected parameter data indicating a selection of the parameters as selected parameters, the selected parameters being a subset of the parameters in the parameter combination data;
   receiving one or more values of a designated parameter of the selected parameters; generating, by a processor, a graph associated with the selected parameters, each of the selected parameters associated with a corresponding axis of the graph, and coordinates of the graph providing an indication of the BER for the values of the selected parameters based on the parameter combination data, wherein the graph comprises a multi-dimensional graph derived from one or more slices of a graph having a higher number of dimensions than the multi-dimensional graph, wherein each of the one or more slices is based at least in part on a respective value of the one or more values of the designated parameter; and
   operating the one or more transceivers using at least one of the selected parameters of the one or more transceivers.

2. The method of claim 1, wherein the selected parameters are parameters of a transmitter of one of the one or more transceivers.

3. The method of claim 1, wherein the selected parameters are parameters of a receiver of one of the one or more transceivers.

4. The method of claim 1, wherein the selected parameters include parameters of a transmitter of a first transceiver and a receiver of a second transmitter, the receiver of the second transmitter to receive data from the transmitter of the first transceiver.

5. The method of claim 1, wherein the selected parameters are parameters of a physical medium attachment (PMA) of a transceiver.

6. Non-transitory computer readable medium having instructions stored thereon for generating a visualization of bit error rates for parameters of one or more transceivers, the instructions executable by a processor to:
   receive parameter combination data comprising parameters of one or more transceivers, wherein the parameter combination data indicates bit error rates (BER) for combinations of values of the parameters of the one or more transceivers;
   receive selected parameter data indicating a selection of the parameters as selected parameters, the selected parameters being a subset of the parameters in the parameter combination data;
   receive one or more values of a designated parameter of the selected parameters;
   generate a graph associated with the selected parameters, each of the selected parameters associated with a corresponding axis of the graph, and coordinates of the graph providing an indication of the BER for the values of the selected parameters based on the parameter combination data, wherein the graph comprises a multi-dimensional graph derived from one or more slices of a graph having a higher number of dimensions than the multi-dimensional graph, wherein each of the one or more slices is based at least in part on a respective value of the one or more values of the designated parameter; and
   operate the one or more transceivers using at least one of the selected parameters of the one or more transceivers.

7. The non-transitory computer readable medium of claim 6, wherein the selected parameters are parameters of a transmitter of one of the one or more transceivers.

8. The non-transitory computer readable medium of claim 6, wherein the selected parameters include parameters of a transmitter of a first transceiver and a receiver of a second transmitter, the receiver of the second transmitter to receive data from the transmitter of the first transceiver.

9. The non-transitory computer readable medium of claim 6, wherein the selected parameters are parameters of a physical medium attachment (PMA) of a transceiver.

10. One or more computing devices for generating a visualization of bit error rates for parameters of one or more transceivers, the one or more computing devices comprising:
   one or more processors operable to execute one or more instructions to;
      receive parameter combination data comprising parameters of one or more transceivers, wherein the parameter combination data indicates indicating bit error rates (BER) for combinations of values of the parameters of the one or more transceivers;
      receive selected parameter data indicating a selection of the parameters as selected parameters, the selected parameters being a subset of the parameters in the parameter combination data;
      receive one or more values of a designated parameter of the selected parameters;
      generate a graph associated with the selected parameters, each of the selected parameters associated with a corresponding axis of the graph, and coordinates of the graph providing an indication of the BER for the values of the selected parameters based on the parameter combination data, wherein the graph comprises a multi-dimensional graph derived from one or more slices of a graph having a higher number of dimensions than the multi-dimensional graph, wherein each of the one or more slices is based at least in part on a respective value of the one or more values of the designated parameter; and
      operate the one or more transceivers using at least one of the selected parameters of the one or more transceivers.

11. The one or more computing devices of claim 10, wherein the selected parameters are parameters of a transmitter of one of the one or more transceivers.

12. The one or more computing devices of claim 10, wherein the selected parameters are parameters of a receiver of one of the one or more transceivers.

13. The one or more computing devices of claim 10, wherein the selected parameters include parameters of a transmitter of a first transceiver and a receiver of a second transmitter, the receiver of the second transmitter to receive data from the transmitter of the first transceiver.

14. The one or more computing devices of claim 10, wherein the parameters comprise operating parameters of the one or more transceivers.

15. The one or more computing device of claim 14, wherein the operating parameters comprise a voltage level, an output differential voltage (VOD) control, pre-emphasis taps, equalization control, or any combination thereof.

16. The method of claim 1, wherein the multi-dimensional graph comprises a two-dimensional graph and the graph having a higher number of dimensions than the multi-dimensional graph comprises a three-dimensional graph.

17. The method of claim 16, wherein generating the graph comprises displaying a first parameter of the selected parameters on a first axis of the graph, displaying a second parameter of the selected parameters on a second axis of the graph, and displaying the BER in the graph along the first and second axes.

18. The non-transitory computer-readable medium of claim 17, wherein the multi-dimensional graph comprises a two-dimensional graph and the graph having a higher number of dimensions than the multi-dimensional graph comprises a three-dimensional graph.

19. The non-transitory computer-readable medium of claim 18, wherein generating the graph comprises displaying a first parameter of the selected parameters on a first axis of the graph, displaying a second parameter of the selected parameters on a second axis of the graph, and displaying the BER in the graph along the first and second axes.

20. The one or more computing devices of claim 10, wherein the multi-dimensional graph comprises a two-dimensional graph and the graph having a higher number of dimensions than the multi-dimensional graph comprises a three-dimensional graph.

21. The one or more computing devices of claim 20, wherein generating the graph comprises displaying a first parameter of the selected parameters on a first axis of the graph, displaying a second parameter of the selected parameters on a second axis of the graph, and displaying the BER in the graph along the first and second axes.

* * * * *